United States Patent
Nardone et al.

(10) Patent No.: US 9,860,338 B2
(45) Date of Patent: Jan. 2, 2018

(54) SYSTEMS, METHODS, AND APPARATUS FOR RELATIONSHIP MAPPING

(71) Applicant: Facebook, Inc., Menlo Park, CA (US)

(72) Inventors: Thomas Dante Nardone, New York, NY (US); Brian Jay Thomas, Palo Alto, CA (US); Zizhuang Yang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 233 days.

(21) Appl. No.: 14/586,526

(22) Filed: Dec. 30, 2014

(65) Prior Publication Data

US 2016/0191656 A1    Jun. 30, 2016

(51) Int. Cl.
| | |
|---|---|
| *G06F 15/16* | (2006.01) |
| *H04L 29/08* | (2006.01) |
| *H04L 12/58* | (2006.01) |
| *G06F 17/30* | (2006.01) |
| *G06Q 50/00* | (2012.01) |

(52) U.S. Cl.
CPC ...... *H04L 67/306* (2013.01); *G06F 17/30876* (2013.01); *G06Q 50/01* (2013.01); *H04L 51/32* (2013.01); *H04L 67/22* (2013.01); *H04L 29/08936* (2013.01); *H04L 51/063* (2013.01)

(58) Field of Classification Search
CPC . H04L 12/588; H04L 51/32; H04L 29/08936; H04L 67/306; H04L 12/583; H04L 12/5835; H04L 51/063; H04L 51/066; H04L 12/585; H04L 29/06829; H04L 51/12; H04L 63/101; G06F 17/30876; G06Q 50/01
USPC ............... 709/204, 206, 217, 219, 229, 246; 705/319; 715/753; 726/4, 27, 29
See application file for complete search history.

(56) References Cited

U.S. PATENT DOCUMENTS

| | | | |
|---|---|---|---|
| 2006/0085515 A1* | 4/2006 | Kurtz .................... | H04L 12/581 709/207 |
| 2006/0281490 A1* | 12/2006 | Dolgas .............. | H04M 1/72547 455/556.2 |
| 2012/0016938 A1* | 1/2012 | Gallant ................... | H04L 12/14 709/204 |
| 2012/0072835 A1* | 3/2012 | Gross ................. | G06Q 30/0269 715/243 |
| 2012/0079023 A1* | 3/2012 | Tejada-Gamero ..... | G06Q 50/01 709/204 |
| 2013/0013700 A1* | 1/2013 | Sittig ..................... | G06Q 10/10 709/206 |
| 2013/0054407 A1* | 2/2013 | Sabur ..................... | G06Q 50/01 705/26.7 |
| 2013/0151635 A1* | 6/2013 | Soundrapandian ... | H04L 51/046 709/206 |
| 2014/0181692 A1* | 6/2014 | Gupta .................. | G06F 17/276 715/753 |

* cited by examiner

*Primary Examiner* — Liangche A Wang
*Assistant Examiner* — Johnny Aguiar
(74) *Attorney, Agent, or Firm* — FisherBroyles, LLP

(57) ABSTRACT

Exemplary methods, apparatuses, and systems for relationship mapping are detailed. In some embodiments, a post by a first user includes a relationship term associated with a second user. Depending upon privacy policy settings, a link to the second user's profile.

17 Claims, 15 Drawing Sheets

SYSTEMS, METHODS, AND APPARATUS FOR RELATIONSHIP MAPPING

FIELD

The various embodiments described herein relate to relationship management. In particular, the embodiments relate to mapping a relationship of an entity.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems for relationship mapping are described.

In one embodiment, a first user provides string of text to a social networking system including a relationship term such as a nickname (e.g., mom). The social networking system maps that string to a second user of the social networking system. For example, the text "At FB with Mom" would map "Mom" to a second user. A post with the string and a link to that mapped user is then provided. For example, a user may click on the text "Mom" to go to that user's profile.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Social networking systems benefit from techniques that improve an ability of users to share online content with other users of the social networking system. These users may share content by sending or posting electronic messages to the social networking system that include text or images associated with other users of the social networking system. For example, a first user of the social networking system may submit a post that includes a string of text regarding second user such as "Enjoying another Kansas City win with Butters" where Butters is a relationship term (e.g., nickname, familial name such as mom or dad, etc.) associated with a second user of the social networking system. Unfortunately, not all viewers of the post will know who or what "Butters" refers to. As will be discussed below, the above string of text may be modified by the social networking system such that the relationship term of "Butters" is mapped to second user (in this case a user named Leopold) of the social networking system and a link to the second user's social networking profile is added to the post.

In the following description, numerous specific details are set forth. However, it is understood that embodiments of the invention may be practiced without these specific details. While a social networking system is used to describe embodiments of preview generation for online content, it will be understood that these concepts are generally applicable to generating previews for online content for other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
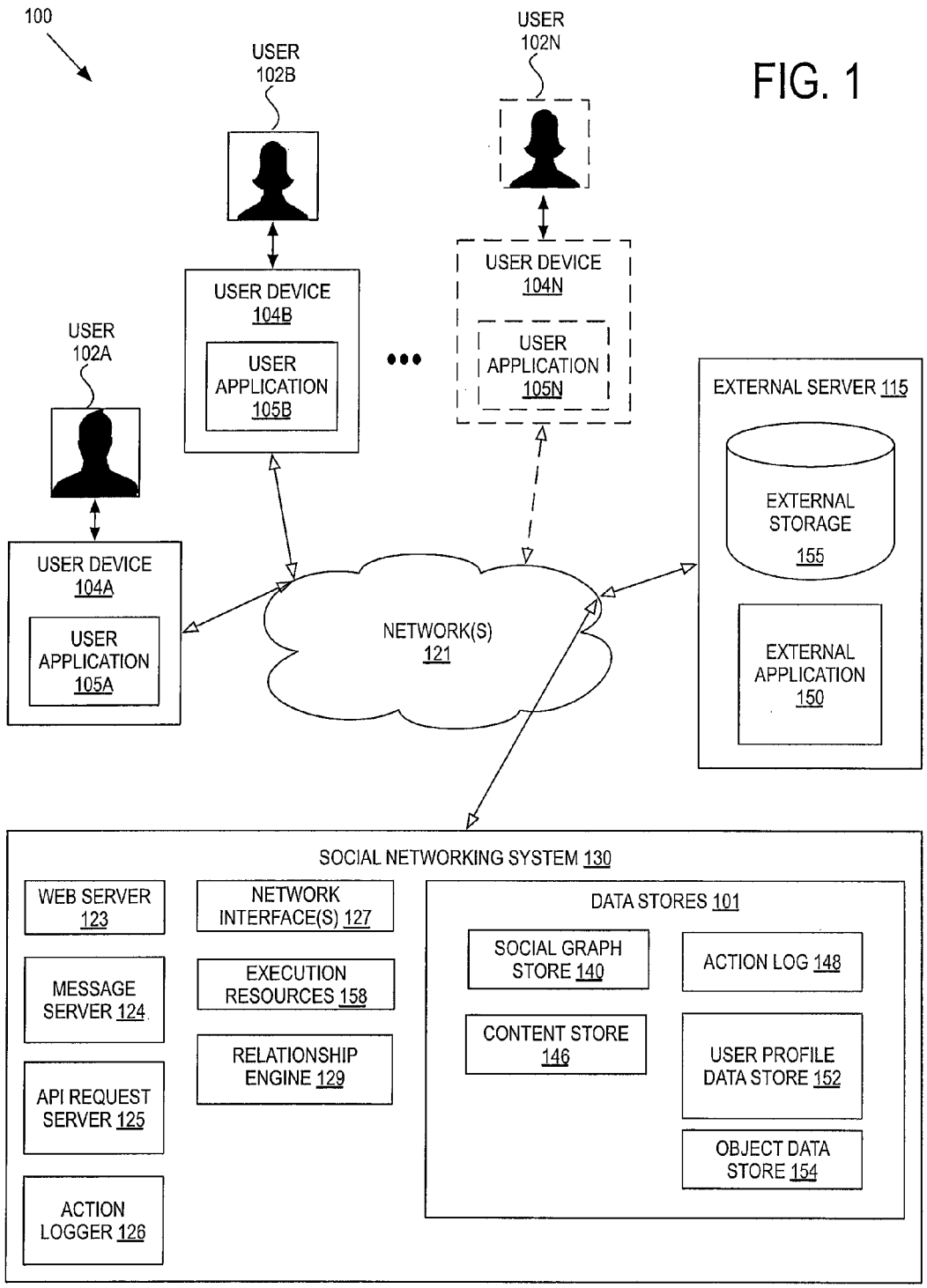
FIG. 1 illustrates an example network environment of a system including a social networking system.

FIG. 1 illustrates an example network environment of a system 100 including a social networking system 130 that offers its users 102A-102N the ability to communicate and interact with other users 102A-102N and entities of the social networking system 130 according to an embodiment of the invention. The illustrated social networking system 130 includes a content creator identification analysis module 129 for automatically identifying content creators from resources shared between users of the social networking system in accordance with an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and an edge store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user. These messages are stored in storage such as message store 1

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles such as posts, images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes relationship engine 129 to be executed on a processor of the social networking system 130. The relationship engine 129 performs one or more functions for providing relationship matching capabilities of the social networking system 130. For example, the relationship engine 129 may perform one or more of: 1) mapping text, images, etc. from a posting of a first user to a second user; 2) determining if the second user allows the mapping to be seen be a third party; 3) storing (or causing the storage of) the post with information about the second user (such as a link to the second user's profile); 4) suggesting a second user based upon a potential mapping; and 5) stripping (or causing the stripping of) information about the second user (such as a link to the second user's profile) when a third party is not allowed to view the information about the second user. Of course, this functionality may be spread across multiple engines.

Figure 2:
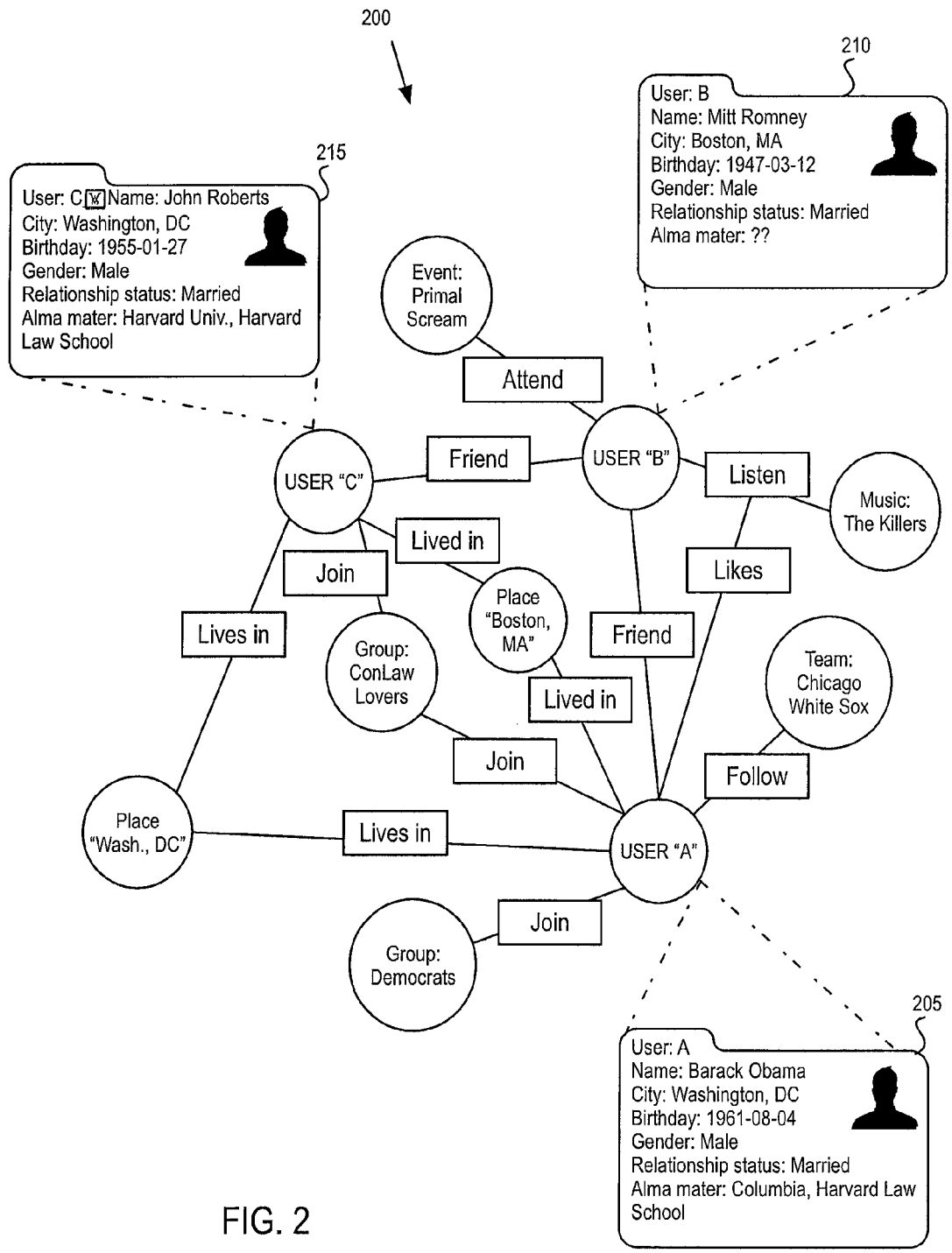
FIG. 2 illustrates exemplary graph of social network data.

FIG. 2 illustrates an exemplary graph of social network data. In the graph, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

Figure 3:
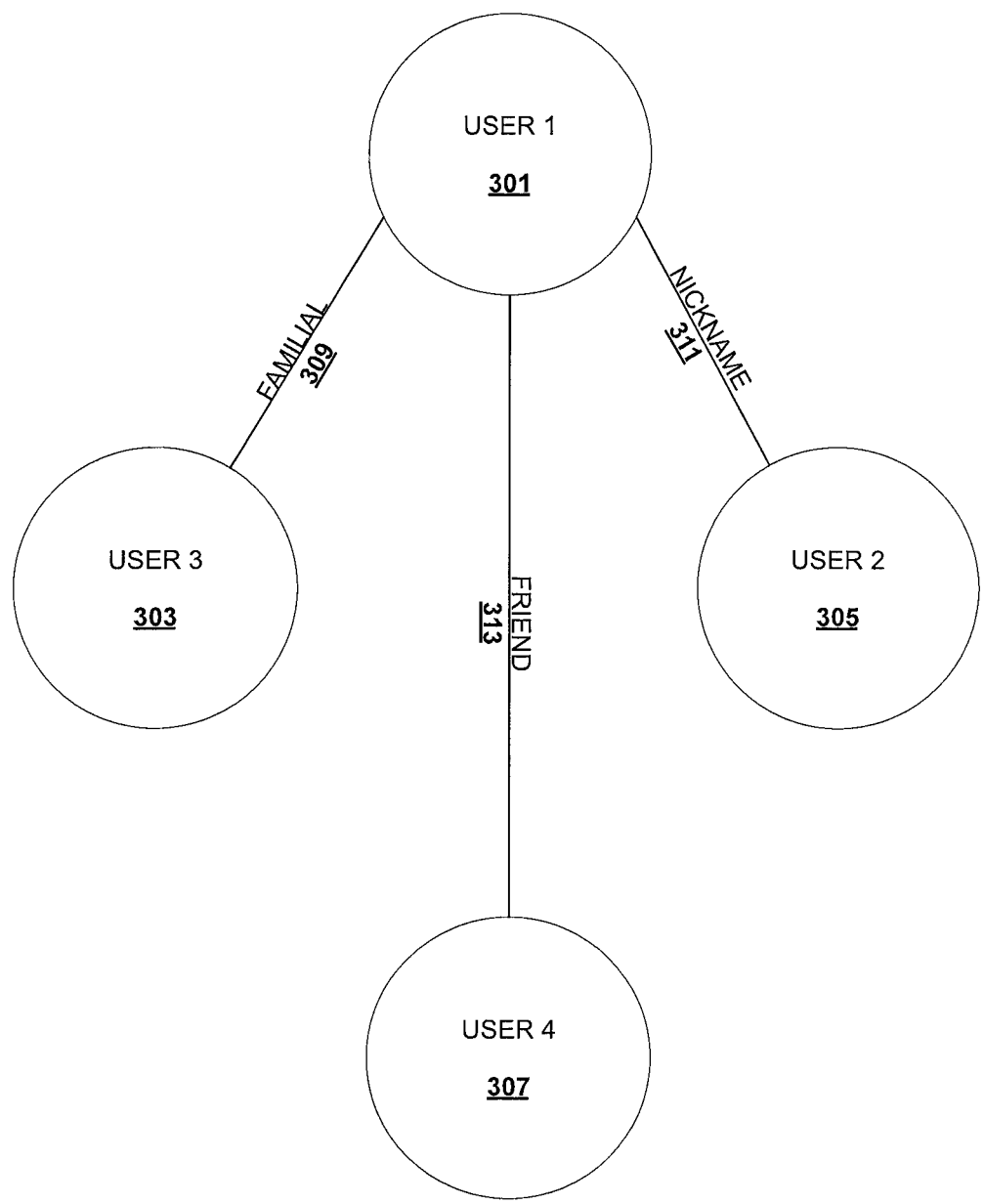
FIG. 3 illustrates an exemplary graph of a social networking system showing relationships between users according to an embodiment.

FIG. 3 illustrates an exemplary graph of a social networking system showing relationships between users according to an embodiment. User 1 301 has relationships with three other users of the social networking system (User 2 305, User 3 303, and User 4 307). User 1 301 has a relationship term in the form of a nickname that he/she uses to describe User 2 305. This is shown by the edge 311 between the user nodes 301 and 305. For example, instead of calling User 2 305 "Dave," User 1 301 may use "Butters" instead. Typically, User 2 has approved the use of this nickname in his/her profile.

User 1 301 has a familial relationship to User 3 303. This is shown by the edge 309 between the user nodes 301 and 303. For example, instead of calling User 3 303 "Mrs. Smith," User 1 301 may use the relationship term "Mom" instead. Typically, this relationship term is set in one or both of the related users' profiles.

User 1 301 has a friend relationship to User 4 307. This is shown by the edge 313 between the user nodes 301 and 307. Unlike the other relationships, there is no relationship term associated with this relationship/user.

The relationships depicted in FIG. 3 may be set in a number of ways. A user (such as User 1 301) may set the relationship terms in his/her profile. For example, a user may have a group of social contacts that are family. The user may affirmatively mark people in this group as being cousins, mother, father, brother, etc. For example, cousin Jon. In some embodiments, the social networking system makes a mapping of relationship terms based on machine learning. For example, if a user wishes another user a "Happy Mother's Day" and also uses text of "Mom" in that or other posts, the social networking system may assume that second user is the first user's mother.

Figure 4:
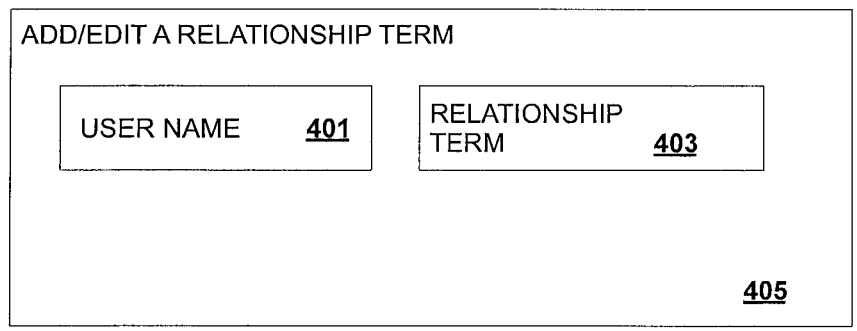
FIG. 4 illustrates an exemplary GUI provided by the social networking system for adding/editing a relationship term to/for a social networking contact according to an embodiment.

FIG. 4 illustrates an exemplary GUI provided by the social networking system for adding/editing a relationship term to/for a social networking contact according to an embodiment. In this GUI 405, a name 401 of a second user is shown to the user adding/editing the relationship term. For example, this GUI 405 may show all of the user's friends in the social networking system, with name 401 being the name that the second user provided to the social networking system. A relationship term 403 may be added/edited through interface 401. For example, the user may type in "father," etc. In some embodiments, a dropdown of common relationships is provided.

Figure 5:
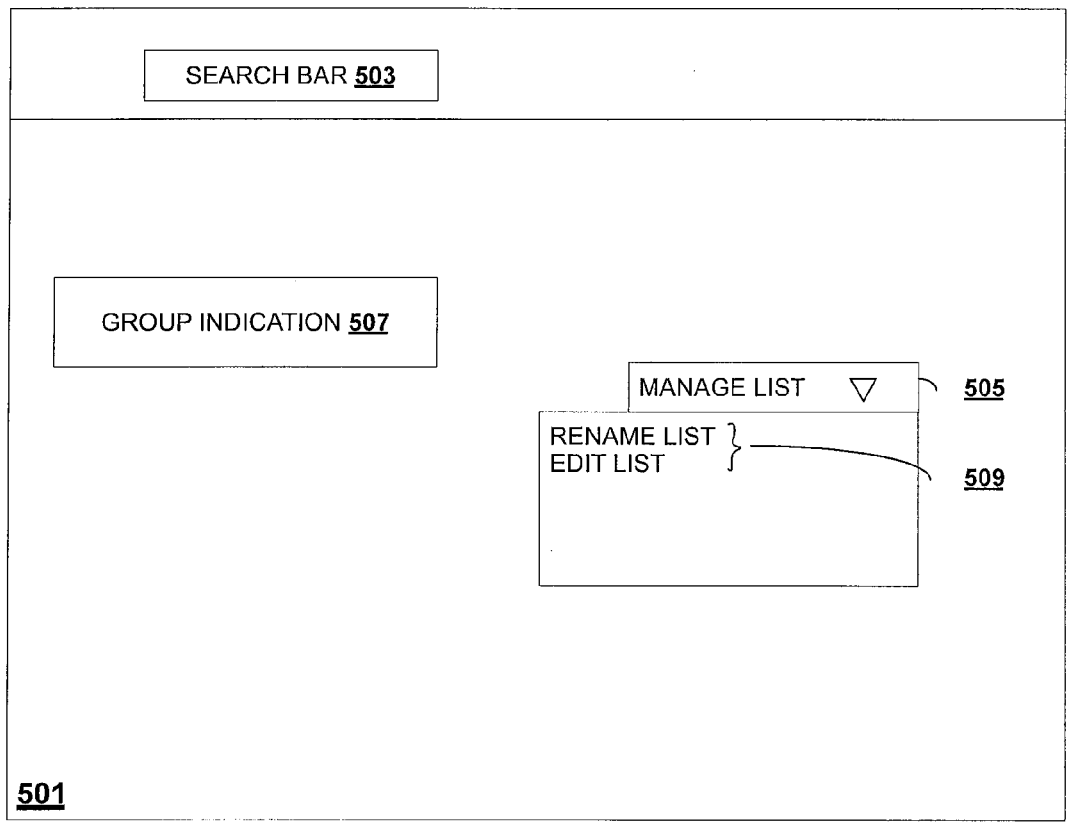
FIG. 5 illustrates an exemplary GUI provided by the social networking system for a group to add/edit relationship terms according to an embodiment.

FIG. 5 illustrates an exemplary GUI provided by the social networking system for a group to add/edit relationship terms according to an embodiment. In this exemplary GUI 501, a group indication 507 is shown for the group to be edited. A dropdown menu 505 allows a user to select optional actions 509 regarding the group such as rename the list (group), edit the list (group), etc. Additionally, a search bar 503 may be provided to search for people to add to the group.

With the ability to use relationship terms, the social networking system can provide a means to show a mapping between a relationship term and a user. Typically, this is shown with a link to the mapped user as detailed below.

Figure 6:
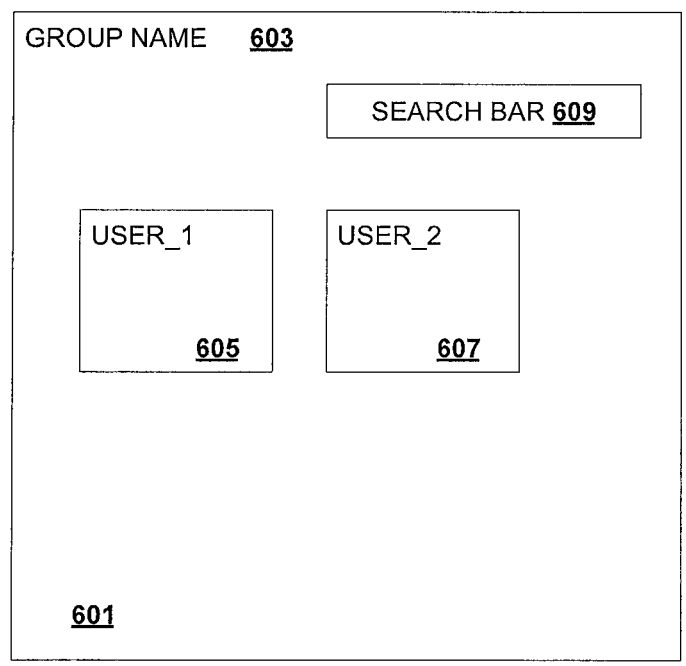
FIG. 6 illustrates an exemplary embodiment of graphical user interface (GUI) 601 provided by the social networking system for editing a group such as family according to an embodiment.

FIG. 6 illustrates an exemplary embodiment of graphical user interface (GUI) 601 provided by the social networking system for editing a group such as family according to an embodiment. In this example, the group's name 603 (such as family, co-workers, etc.) is shown to the user. The user may select an option to edit the group or group name. In this example, the group of 601 includes two users (User_1 605 and User_2 607). Other users may be added through the use of a search bar 609 that allows the user that owns this group to search either his/her social networking contacts or the social network as a whole for people to add to the group. Users may also be removed from the group through this interface.

Figure 7:
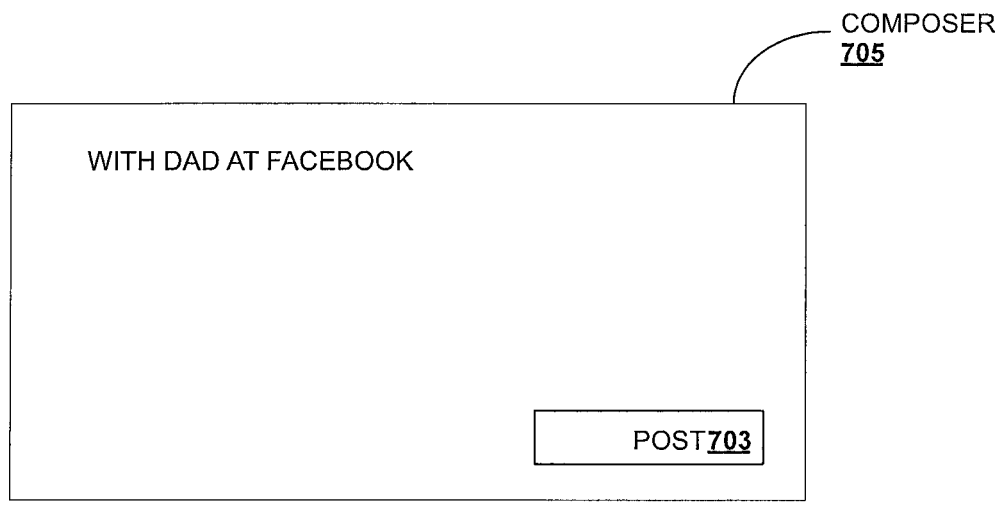
FIG. 7 illustrates an exemplary GUI (called a composer in the illustration) provided by the social networking system for a user to generate a post according to an embodiment.

FIG. 7 illustrates an exemplary GUI (called a composer in the illustration) provided by the social networking system for a user to generate a post according to an embodiment. In this exemplary GUI 705, a user has typed the string "With Dad at FB." At this point, there has been no mapping of a relationship term "Dad" to another user of the social networking system. The posting user may cause the posting of this text using a post mechanism 703 provided by the social networking system.

Figure 8:
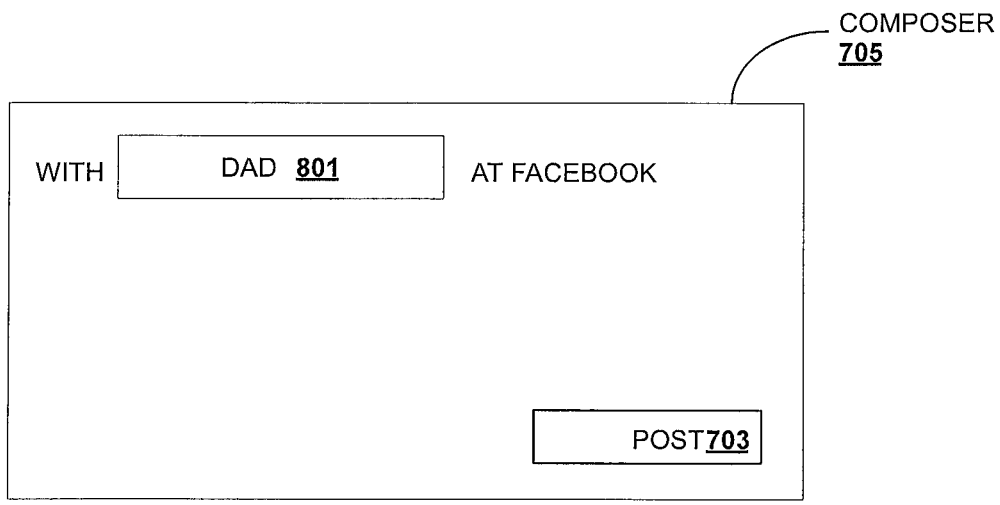
FIG. 8 illustrates an exemplary GUI (called a composer in the illustration) provided by the social networking system for a user to generate a post that includes a link to a second user.
Figure 9:
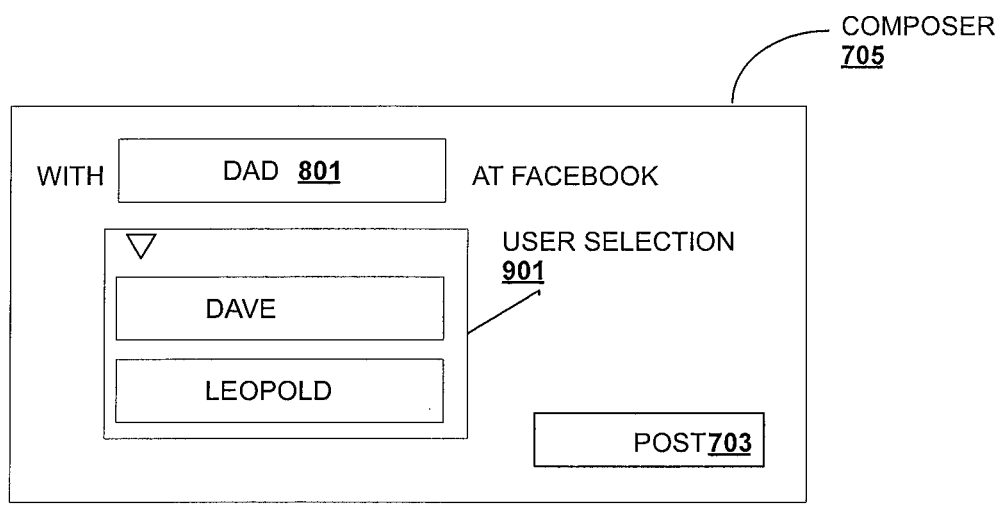
FIG. 9 illustrates an exemplary GUI (called a composer in the illustration) provided by the social networking system for a user to generate a post that includes a link to a second user.

FIG. 8 illustrates an exemplary GUI (called a composer in the illustration) provided by the social networking system for a user to generate a post that includes a link to a second user. In this exemplary GUI 705, a user has typed the string "With Dad at FB." Unlike the previous example, a mapping of the relationship term "Dad" to another user of the social networking system has occurred a suggested profile link 801 to that user's profile is included in the post. In some embodiments, the posting user is provided with a dropdown 907 or other confirmation mechanism regarding the suggested profile link 801 such as shown in FIG. 9. The posting user may cause the posting of this text using a post mechanism 703 provided by the social networking system.

Figure 10:
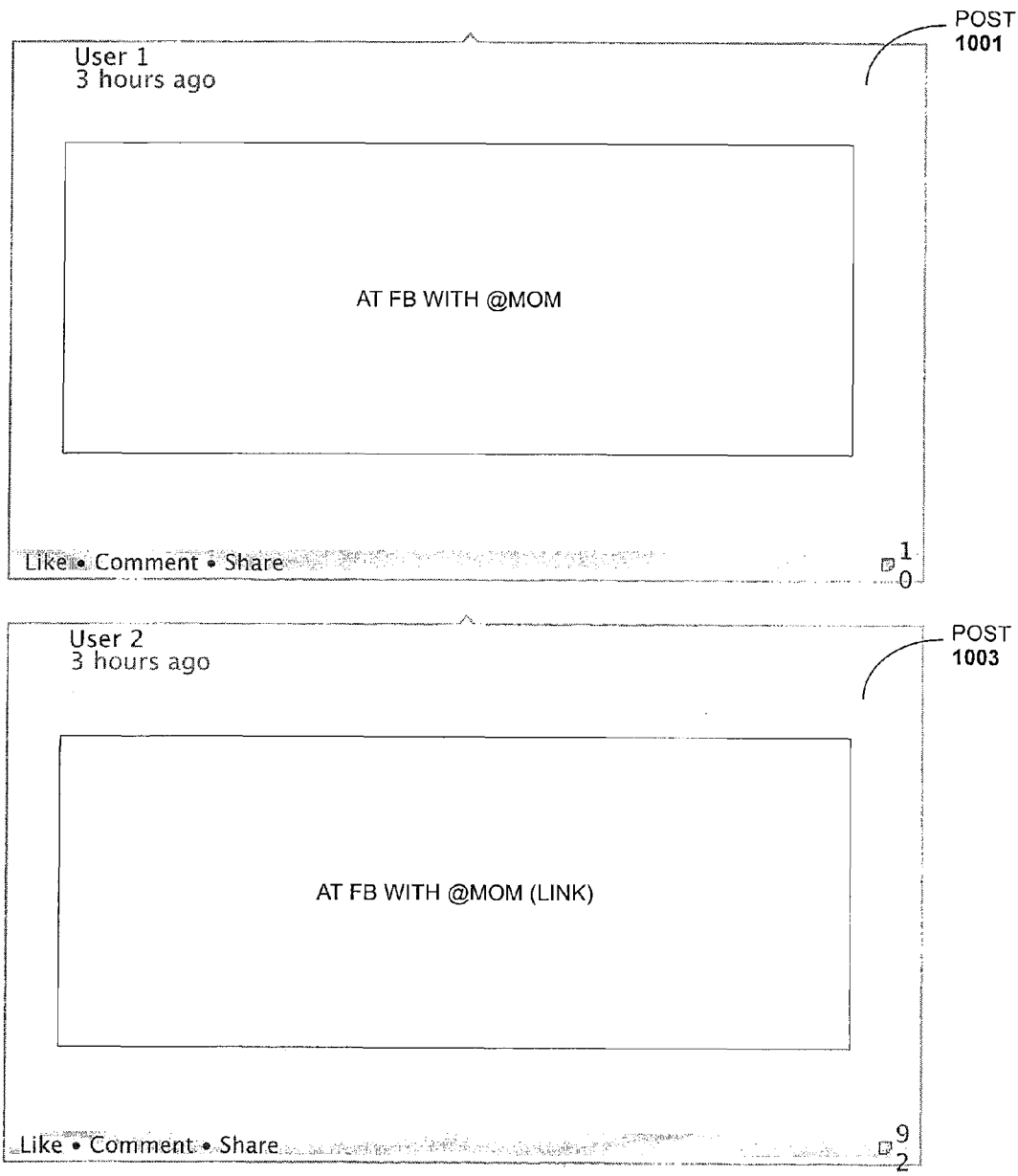
FIG. 10 illustrates an exemplary embodiment of a social networking system feed.

FIG. 10 illustrates an exemplary embodiment of a social networking system feed. In this illustration, the top post 1001 from User 1 includes a relationship term of "Mom." However, the viewing user does not have permission to see the mapping of "Mom" to a second user. The bottom post 1003 from User 2 includes a relationship term of "Mom." In this instance the viewing user does have permission to see the mapping of "Mom" to a second user and is provided a link in the post to that second user.

Figure 11:
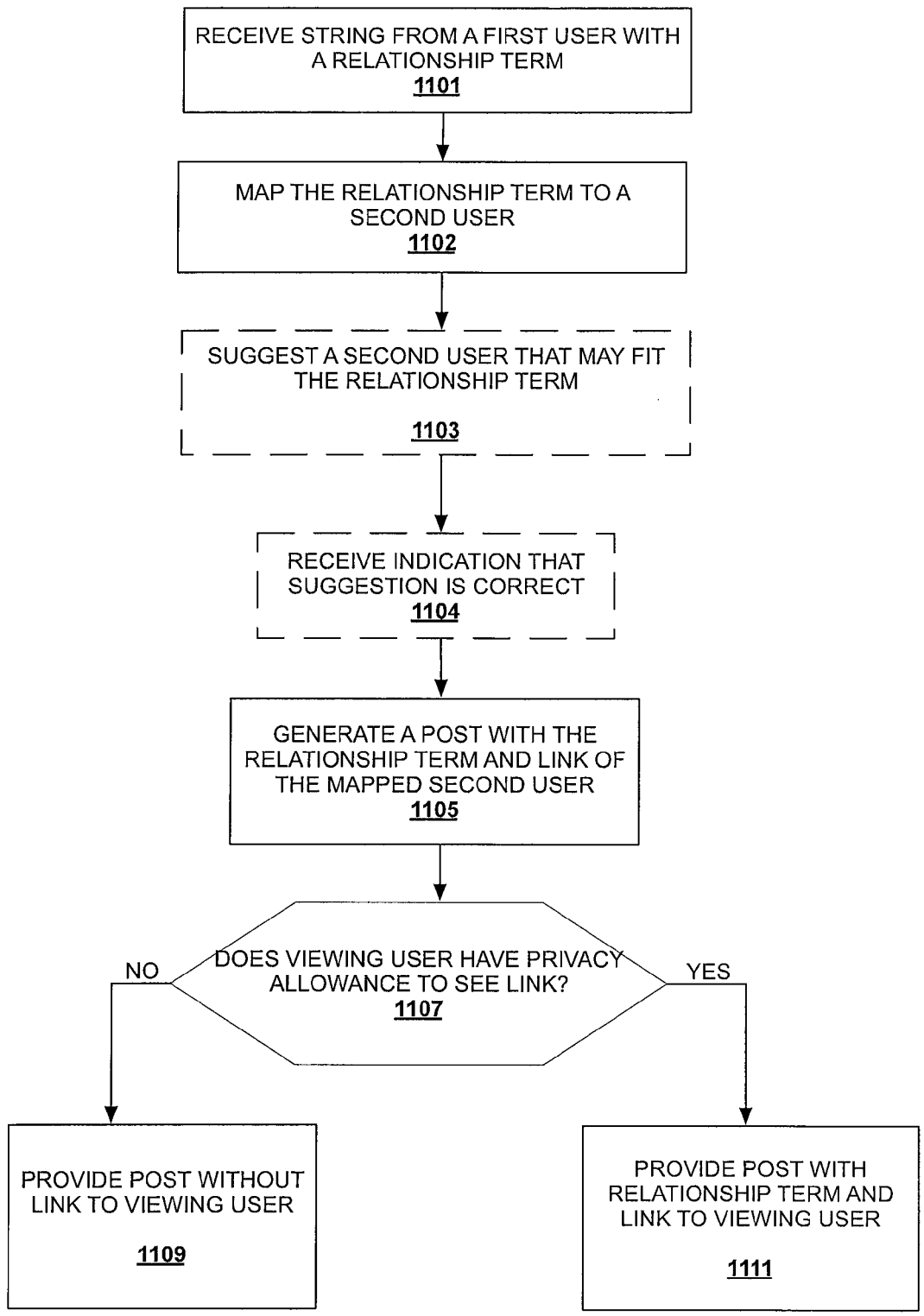
FIG. 11 illustrates an exemplary method for providing relationship mapping in a post of a social networking system according to an embodiment.

FIG. 11 illustrates an exemplary method for providing relationship mapping in a post of a social networking system according to an embodiment. This method is executed by one or more components of the social networking system. For example, a processor of the social networking system executes the relation engine 129 to perform this method according to an embodiment. While the discussion below deals with a string of text, the method is also applicable to images of users where the users are tagged, etc.

At 1101, the social networking system receives a string of text from a first user of the social networking system that includes a relationship term (such as a nickname). For example, the first user may type this text into a composer for the social networking system and the social networking system receives this text. At 1102, the social networking system maps the relationship term to a second user of the social network. For example, in some embodiments the social networking system looks at edges of the social graph associated with the first user to find a match. In other embodiments, the social networking system maps the relational term to a second user based on a field in the first user's profile.

In some embodiments, at 1103, the social networking system suggests a second user that may fit the relationship term of the post. For example, if the text is "With Mom" the social networking system may suggest a second user's profile that potentially fits the term "Mom." This suggestion is sent by the social network to the first user to be displayed to the first user. In most embodiments, the suggestion comes from a previous mapping that the first user has done such as detailed earlier. Typically, this relationship term is stored by the first user's profile, but may also be stored in the second user's profile.

In some embodiments, at 1104, the social networking system receives an indication from the first user that the suggestion was correct. For example, the first user affirms that the relationship is true and that affirmation is sent by the first user to the social networking system.

At 1105, the social networking system generates a post with the relationship term and a link to the second user's profile. This post generation is in response to a post command received from the first user. The generated post is stored by the social networking system. For example, the post is stored in content store 146. In some embodiments, a post with the link is stored as well as a post without the link.

At some later point in time, a third (viewing) user will request to see the generated post through the social networking system. For example, the third user may access his/her page that with either the first or second user as a social contact. Prior to displaying the post of 1105, the social networking system determines if the third user has proper privileges to see the link at 1107. In particular, the social networking system uses the first or second user's privacy settings to determine if the third user is allowed to see the link. For example, does the first or second user allow this particular contact to see the mapping? Generally, it is the privacy settings of the second user that dictate allowance or not. There are two privacies associated with relationships, the author's and the second user's. Each person controls their own policy in this regard. For the purpose of displaying or not displaying the second user's link on the author's post, since the post is written (i.e. controlled) by the author, the privacy of the link is also determined by the author's privacy policy for that relationship.

When the third user is not allowed to see the link, a post without the link is provided (transmitted) to the third user by the social networking system at 1109. In this example, only "With Mom" will be displayed. In some embodiments, a post that was previously stored without the link is provided. In other embodiments, the social networking system strips the link dynamically prior to providing the post if a link was included in the same post.

When the third user is allowed to see the link, the post with the link is provided (transmitted) to the third user by the social networking system at 1111. In most embodiments, a post that was previously stored with the link is provided.

Figure 12:
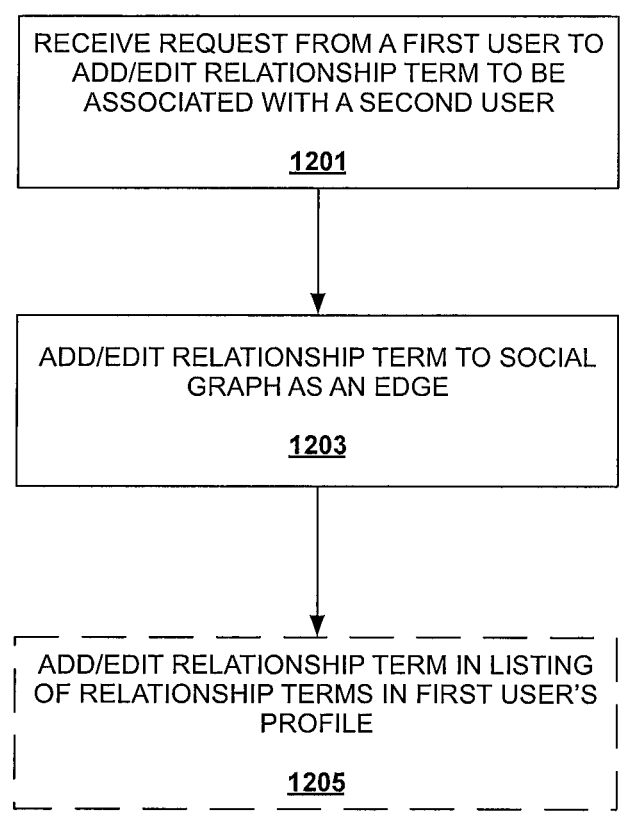
FIG. 12 illustrates an exemplary method for adding/editing a relationship term in a social networking system according to an embodiment.

FIG. 12 illustrates an exemplary method for adding/editing a relationship term in a social networking system according to an embodiment. This method is executed by the social networking system. For example, a processor of the social networking system executes the relation engine 129 to perform this method according to an embodiment.

At 1201, the social networking system receives a request from a first user to add/edit a relationship term to be associated with a second user. For example, the first user uses one of the previously illustrated GUIs to add/edit a nickname to be associated with the second user.

At 1203, the social networking system adds/edits the relationship term to the social graph as an edge of the graph. For example, the social networking system adds/edits an edge such as those shown in FIG. 3.

At 1205, the social networking system adds/edits the relationship term to a listing of relationship terms in the first user's profile. For example, the first user's profile may have fields for mother, father, etc. that are filled in by the social networking system.

Figure 13:
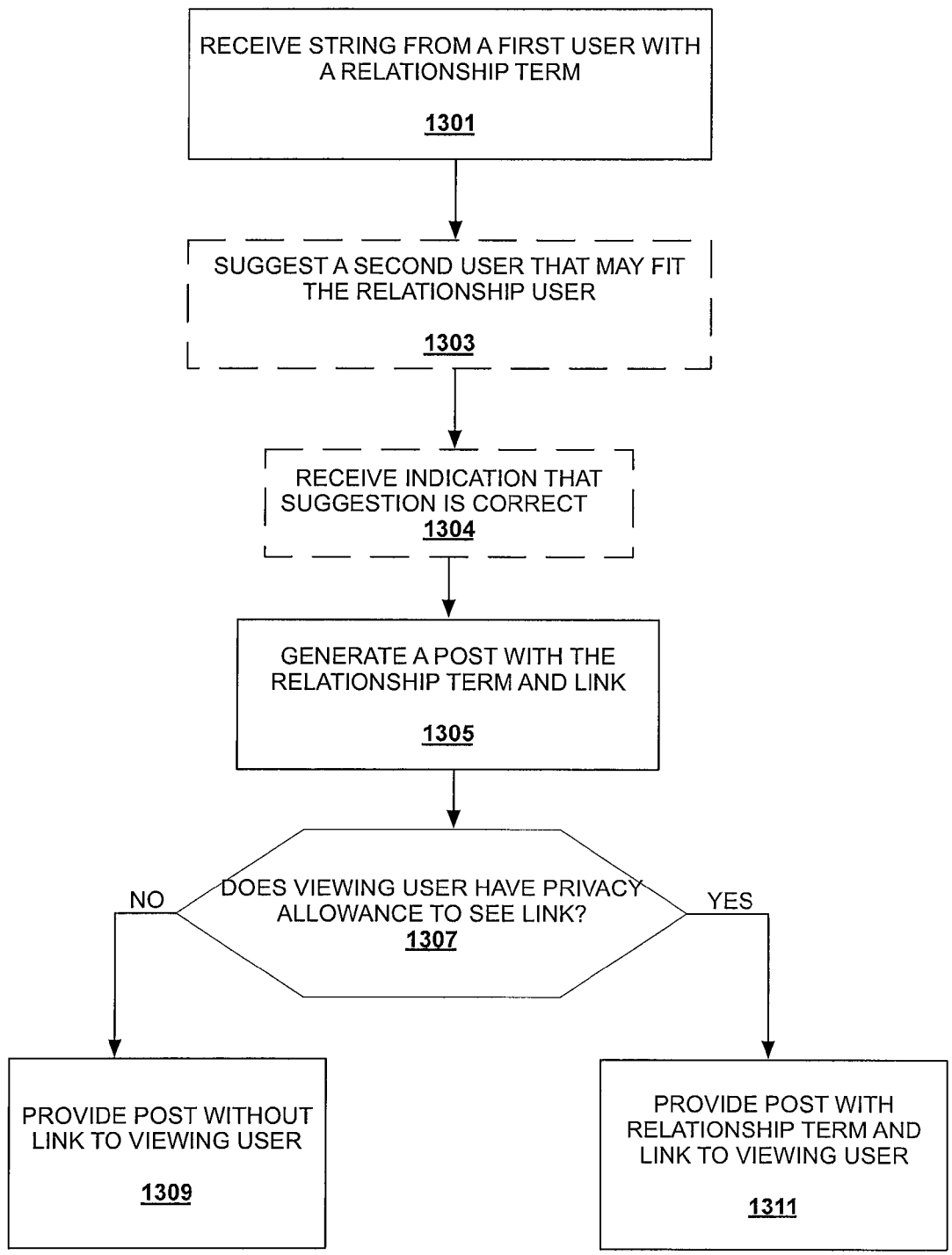
FIG. 13 illustrates an embodiment of a method for processing relationship terms of a user message in a social networking system.

FIG. 13 illustrates an embodiment of a method for processing relationship terms of a user message in a social networking system. For example, a processor of the social networking system executes the relationship engine 129 to perform this method according to an embodiment. While the discussion below deals with a string of text, the method is also applicable to images of users where the users are tagged, etc.

At 1301, the social networking system receives a relationship term associated with a second user to be included in a post from a first user (a posting user). For example, a first user uses a composer of the social networking system to type a string of text of "At FB with Mom" which the social networking system receives. In this example, "Mom" is the relationship term associated with a second user. Additionally, in some embodiments the user ID that the alternate name is associated with is stored. Typically, a relationship engine (such as relationship engine 129) receives this term for processing. However, this term does not need to be directly received by this engine, but could be passed along from another entity within the social networking system.

In some embodiments, a relationship term is identified by, or includes, the use of one or more name indicator characters during typeahead. For example, an "@" (or other character) may proceed or follow the relationship term such as showing "At FB with @Mom" while typing will be "At FB with Mom" on posting. At 1302, the social networking system maps the relationship term to the second user of the social network. For example, in some embodiments the social networking system looks at edges of the social graph associated with the first user to find a match. In other embodiments, the social networking system maps the relational term to a second user based on a field in the first user's profile. During write-time validation, a verification that the relationship term is valid is made.

In some embodiments, a look-up by the social networking system is performed at 1303 to find the second user's profile. In particular, the second user's privacy settings are looked up by the social networking system. These settings are stored, for example, in a user profile store such as store 152 or a social graph store 140.

A look-up to find nickname(s) usable by the first user is made by the social networking system is performed at 1305. For example, in some embodiments, the social networking system looks at a graph corresponding to the first user to see if a relationship term has been saved as an edge to the second user and therefore mapped to the second user. In other embodiments, the social networking system looks at profile fields corresponding to the first user to see if a relationship term has been saved relating to the second user and therefore mapped to the second user. These settings are stored, for example, in a user profile store such as store 152 or a social graph store 140.

While not illustrated, in some embodiments, the social networking system provides a means for the first user to confirm the relationship such as a dropdown, etc. found in the look-up of 1305. An example of this was discussed earlier. A submitted post including the relationship term is received by the social networking system.

A decision of if the first user is allowed to use relationship mapping is made by the social networking system at 1307 according to some embodiments. Typically, this decision is made based upon the privacy settings set by the second user. While not illustrated, in some embodiments the social networking system queries the second user for permission to use a link to the second user's profile.

When the first user is not allowed to use relationship mapping, the submitted post is persisted to storage without a link to the second user's profile at 1309 according to some embodiments. In this situation, identifying information about the second user is not stored with the post. In the exemplary system of FIG. 1 this post is persisted into content store 146.

When the first user is allowed to use relationship mapping, the submitted post is persisted to storage with a link to the second user's profile at 1313 in some embodiments. In this situation, identifying information about the second user is stored with the post. In the exemplary system of FIG. 1 this post is persisted into content store 146.

At some point later in time, the social networking system provides (transmits) an unmodified version of the persisted post to a user other than the posting user at 1311 to be displayed by the other user.

Figure 14:
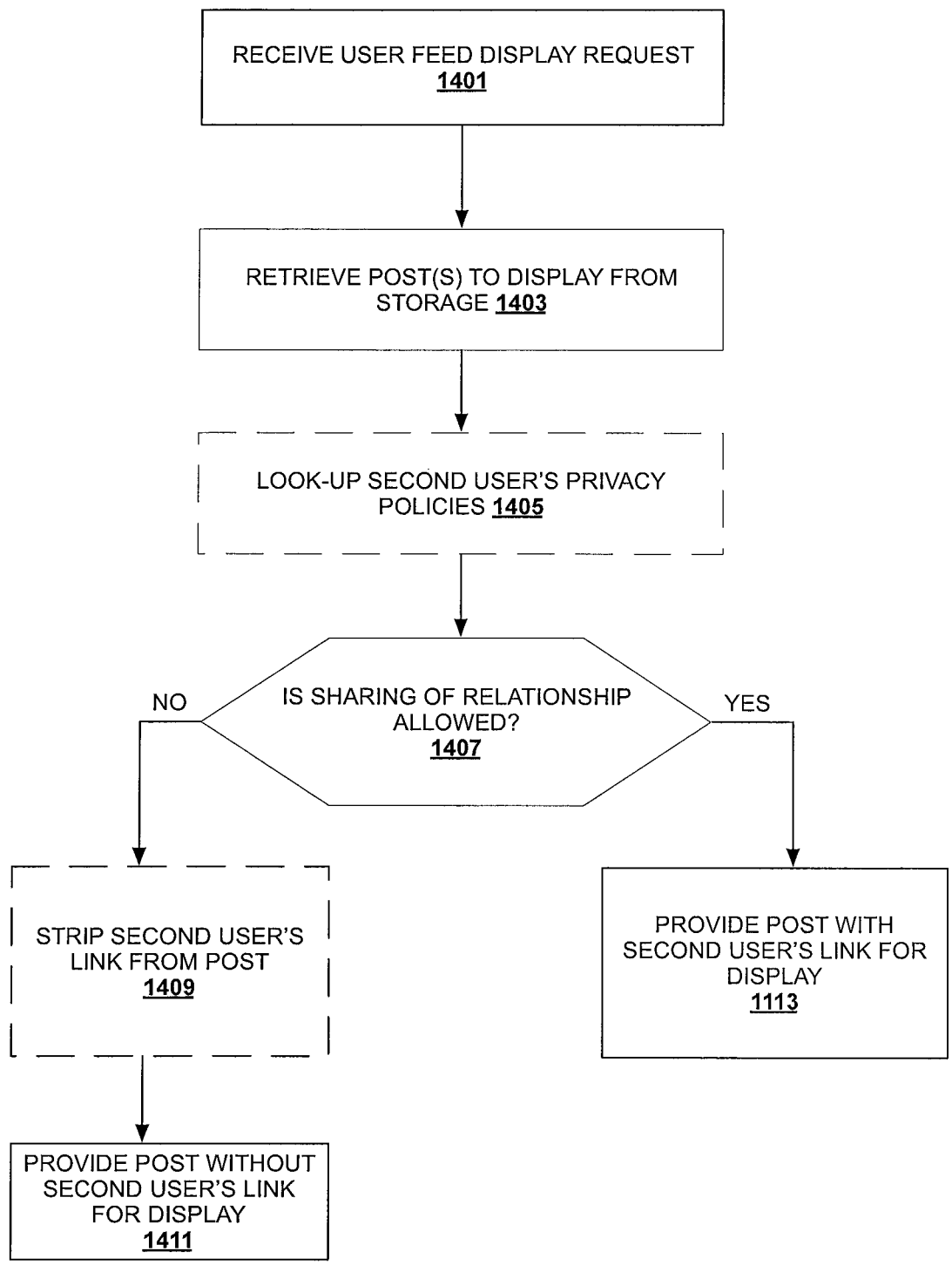
FIG. 14 illustrates an embodiment of a method for displaying relationship mapping of a user message in a social networking system.

FIG. 14 illustrates an embodiment of a method for displaying relationship mapping of a user message in a social networking system. For example, a processor of the social networking system executes the relation engine 129 to perform at least some aspects of this method according to an embodiment. While the discussion below deals with a string of text, the method is also applicable to images of users where the users are tagged, etc.

At 1401, the social networking system receives a request to display a feed associated with a user (viewing user). For example, a viewing user logs in to his home feed on the social networking system.

The social networking system retrieves one or more posts to display to the viewing user at 1403. For example, the social networking system retrieves posts for the viewing user from content store 146.

When a retrieved post includes a relationship term, in some embodiments, a look-up by the social networking system is performed at 1405 to find a mentioned second user's profile and his/her privacy policies. Relationship privacy is based on the author's (first user's) relationship policy.

A decision of if the first user is allowed to use relationship mapping is made by the social networking system at 1407 according to some embodiments. Typically, this decision is made based upon the privacy settings set by the second user. While not illustrated, in some embodiments the social networking system queries the second user for permission to use a link to the second user's profile.

When the first user is not allowed to use the relationship mapping, any mention of the second user's identification is stripped from the retrieved post at 1409 by the social networking system. For example, the relation engine 129 strips a link to the second user's profile. If the retrieved post did not already include the relationship mapping then no change to the post would be made. The post not including a link to the second user's profile is provided (transmitted) to the viewing user for display at 1411.

When the first user is allowed to use relationship mapping, the retrieved post including a link to the second user's profile is provided (transmitted) to the viewing user for display at 1413. In embodiments where the persisted post included this link, the post is provided as is to the viewing user. In embodiments where the persisted post did not include this link, this link is added prior to provision of the persisted post to the viewing user.

As detailed above, in some embodiments, validation is performed both a write time and at read time. Write-time validation keeps data quality higher, by not allowing bogus tags to be stored in our system. Read-time validation is necessary because the viewer affects what tags are visible/invisible.

Figure 15:
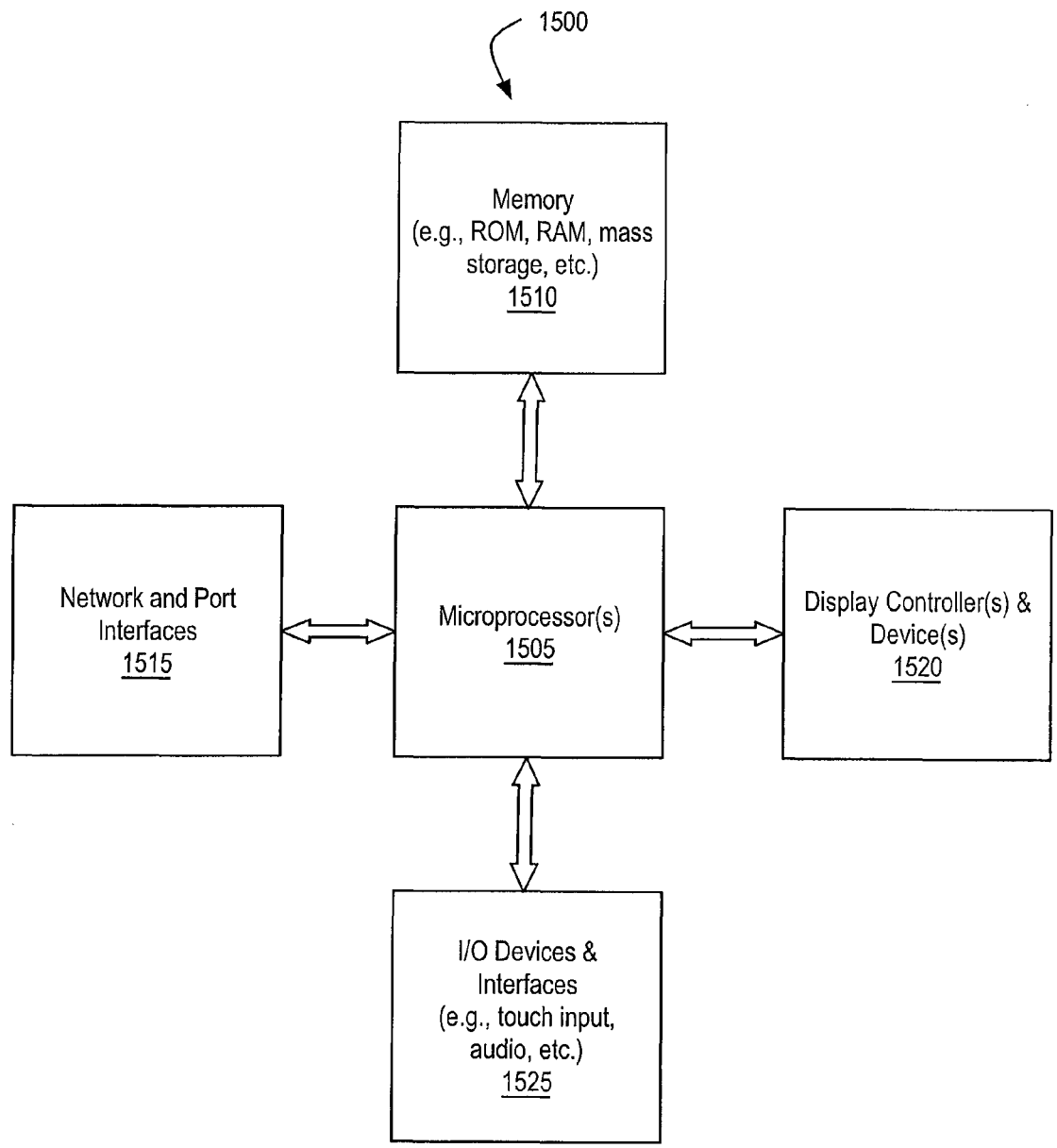
FIG. 15 illustrates, in block diagram form, an exemplary processing system to perform relationship mapping.

FIG. 15 illustrates, in block diagram form, an exemplary processing system to perform relationship mapping. In some embodiments, this is a high-level view of social networking system 1130 described herein. Data processing system 1500 includes one or more microprocessors 1505 and connected system components (e.g., multiple connected chips). Alternatively, data processing system 1500 is a system on a chip.

Data processing system 1500 includes memory 1510, which is coupled to microprocessor(s) 1505. Memory 1510 may be used for storing data, metadata, and programs for execution by the microprocessor(s) 1505 including the modules and engines detailed above. For example, memory 1510 may include one or more of the data stores 101 and/or may store modules described herein. Memory 1510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1510 may be internal or distributed memory.

Data processing system 1500 includes network and port interfaces 1515, such as a port, connector for a dock, or a connector for a USB interface, FireWire, Thunderbolt, Ethernet, Fibre Channel, etc. to connect the system 1500 with another device, external component, or a network. Exemplary network and port interfaces 1515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1500 with another device, external component, or a network and receive stored instructions, data, tokens, etc.

Data processing system 1500 also includes display controller and display device 1520 and one or more input or output ("I/O") devices and interfaces 1525. Display controller and display device 1520 provides a visual user interface for the user. I/O devices 1525 allow a user to provide input to, receive output from, and otherwise transfer data to and from the system. I/O devices 1525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 15.

Data processing system 1500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1500 may be a network computer, server, or an embedded processing device within another device or consumer electronic product. As used herein, the terms computer, device, system, processing system, processing device, and "apparatus comprising a processing device" may be used interchangeably with data processing system 1500 and include the above-listed exemplary embodiments.

Additional components, not shown, may also be part of data processing system 1500, and, in certain embodiments, fewer components than that shown in FIG. 15 may also be used in data processing system 1500. It will be apparent from this description that aspects of the inventions may be embodied, at least in part, in software. That is, the computer-implemented methods detailed above may be carried out in a computer system or other data processing system 1500 in response to its processor or processing system 1505 executing sequences of instructions contained in a memory, such as memory 1510 or other non-transitory machine-readable storage medium. The software may further be transmitted or received over a network (not shown) via network interface device 1515. In various embodiments, hardwired circuitry may be used in combination with the software instructions to implement the present embodiments. Thus, the techniques are not limited to any specific combination of hardware circuitry and software, or to any particular source for the instructions executed by data processing system 1500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions.

Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving a string of text from a first user, the string of text including a relationship term indicating a type of relationship between the first user and a second user, a first profile of the first user connected to a second profile of the second user within a communication system;
   accessing the first profile of the first user to identify an association between the relationship term and the second user;
   mapping the relationship term to the second user based on the identified association between the relationship term and the second user;
   generating a first post within the communication system including the string of text and a link to the second profile based upon the mapping of the relationship term to the second user, the link embedded within the relationship term; and
   persisting the first post in a content store.

2. The computer-implemented method of claim 1, further comprising:
   persisting a second post in the content store including only the string of text and no link to the second profile based upon the mapping of the relationship term to the second user.

3. The computer-implemented method of claim 1, further comprising:
   prior to persisting the first post in the content store, determining that the second user's privacy policies allow for a third user to view the first post including the link to the second profile.

4. The computer-implemented method of claim 1, further comprising:
   upon a request from a third user, transmitting the first post to the third user.

5. The computer-implemented method of claim 1, further comprising:
   upon a request from a third user for the first post, determining that the third user is not allowed to see the first post, and
   transmitting a second post to the third user.

6. The computer-implemented method of claim 1, further comprising:
   upon a request from a third user for the first post, determining that the third user is not allowed to see the first post, and
   stripping the link to the second profile from the first post;
   transmitting the first post to the third user with the link to the second profile stripped from the first post.

7. The computer-implemented method of claim 1, wherein the relationship term includes a name indicator character.

8. A non-transitory computer-readable medium storing instructions which, when executed by one or more processors in a processing device, cause the processing device to perform a method comprising:
   receiving a string of text from a first user, the string of text including a relationship term indicating a type of relationship between the first user and a second user, a first profile of the first user connected to a second profile of the second user within a communication system;
   accessing the first profile of the first user to identify an association between the relationship term and the second user;
   mapping the relationship term to the second user based on the identified association between the relationship term and the second user;
   generating a first post within the communication system including the string of text and a link to the second profile based upon the mapping of the relationship term to the second user, the link embedded within the relationship term; and
   persisting the first post in a content store.

9. The non-transitory computer-readable medium of claim 8, wherein the method further comprises:
   persisting a second post in the content store including only the string of text and no link to the second profile based upon the mapping of the relationship term to the second user.

10. The non-transitory computer-readable medium of claim 8, wherein the method further comprises:
    prior to persisting the first post in the content store, determining that the second user's privacy policies allow for a third user to view the first post including the link to the second profile.

11. The non-transitory computer-readable medium of claim 8, wherein the method further comprises:
    upon a request from a third user, transmitting the first post to the third user.

12. The non-transitory computer-readable medium of claim 8, wherein the method further comprises:
    upon a request from a third user for the first post, determining that the third user is not allowed to see the first post, and
    transmitting a second post to the third user.

13. The non-transitory computer-readable medium of claim 8, wherein the method further comprises:
    upon a request from a third user for the first post, determining that the third user is not allowed to see the first post, and
    stripping the link to the second profile from the first post;
    transmitting the first post to the third user with the link to the second profile stripped from the first post.

14. The non-transitory computer-readable medium of claim 8, wherein the relationship term includes a name indicator character.

15. An apparatus comprising:
    a memory to store instructions;
    a hardware processing device to execute the stored instructions to cause the apparatus to:
    receive a string of text from a first user, the string of text including a relationship term indicating a type of relationship between the first user and a second user, a first profile of the first user connected to a second profile of the second user within a communication system;

access the first profile of the first user to identify an association between the relationship term and the second user;

map the relationship term to the second user based on an association between the relationship term and the second user in a profile of the first user;

generate a post within the communication system including the string of text and a link to the second profile based upon the mapping of the relationship term to the second user, the link embedded within the relationship term; and persist the post in a content store.

16. The apparatus of claim 15, wherein the relationship term includes a name indicator character.

17. The apparatus of claim 15, wherein the apparatus in response to executing the stored instructions to further upon a request from a third user, transmitting the post to the third user.

* * * * *